(12) United States Patent
Bland (10) Patent No.: US 7,647,777 B2
(45) Date of Patent: Jan. 19, 2010

(54) SKID ARCHITECTURE FOR A POWER AUGMENTATION SYSTEM

(75) Inventor: Robert Bland, Oviedo, FL (US)

(73) Assignee: Gas Turbine Efficiency Sweden AB (SE)

( * ) Notice: Subject to any disclaimer, the term of this patent is extended or adjusted under 35 U.S.C. 154(b) by 104 days.

(21) Appl. No.: 12/143,254

(22) Filed: Jun. 20, 2008

(65) Prior Publication Data

US 2009/0314256 A1 Dec. 24, 2009

(51) Int. Cl.
*F02C 7/00* (2006.01)
*F02C 9/00* (2006.01)
*F02C 3/30* (2006.01)

(52) U.S. Cl. .............. 60/775; 60/39.3; 60/39.53

(58) Field of Classification Search ............ 60/39.48, 60/39.3, 39.53, 39.54, 775; 239/67, 68, 69, 239/407, 408
See application file for complete search history.

(56) References Cited

U.S. PATENT DOCUMENTS

| | | | |
|---|---|---|---|
| 5,170,622 A * | 12/1992 | Cheng | 60/775 |
| 5,540,045 A * | 7/1996 | Corbett et al. | 60/39.3 |
| 5,784,875 A * | 7/1998 | Statler | 60/775 |
| 5,867,977 A * | 2/1999 | Zachary et al. | 60/39.53 |
| 6,073,637 A * | 6/2000 | Hayward et al. | 134/22.1 |
| 6,209,310 B1 * | 4/2001 | Kuenzi et al. | 60/775 |
| 6,478,289 B1 * | 11/2002 | Trewin | 261/27 |
| 6,553,768 B1 * | 4/2003 | Trewin et al. | 60/772 |
| 6,938,425 B2 * | 9/2005 | Simpson et al. | 60/775 |
| 7,428,818 B2 * | 9/2008 | Hjerpe | 60/775 |
| 7,487,642 B2 * | 2/2009 | Joshi et al. | 60/775 |
| 2007/0001026 A1 * | 1/2007 | Lecheler et al. | 239/67 |

* cited by examiner

*Primary Examiner*—Thomas N Moulis
(74) *Attorney, Agent, or Firm*—DLA Piper LLP (57) ABSTRACT

A fluid delivery skid with a pre-fill system for supplying fluid has one or more stages including a first valve and a second valve, each having an open and closed position. The stages have active and inactive states to provide a desired flow rate of fluid to an apparatus for distribution of the fluid. In an active state, fluid is received in the stage and pressurized with the first valve open and the second valve closed. Further, in an active state, fluid is released with the first valve closed and the second open. In an inactive state, at least the second valve is closed. A control unit is connected to a pump unit and controls operation of the pump to regulate the stages to supply pressure at a level determined to achieve the desired flow rate.

32 Claims, 5 Drawing Sheets

FIG. 5

SKID ARCHITECTURE FOR A POWER AUGMENTATION SYSTEM

TECHNICAL FIELD

The present disclosure relates to power augmentation of gas turbines. More specifically, a fluid delivery skid with a pre-fill system adapted for a power augmentation system supplies fluid to an injection apparatus for saturating and cooling intake air as it enters a gas turbine to augment power of the gas turbine.

BACKGROUND

A power augmentation process for a gas turbine in which the intake air is humidified, and thus cooled, is performed to produce more power for the gas turbine. Water is added to the intake air to saturate and cool the air as it enters the gas turbine. The cooler, and thus denser, air augments the power of the gas turbine. A power augmentation system may include a controller, a fluid delivery skid, and an injection apparatus with multiple spray arrays. The controller provides commands to the fluid delivery skid, which supplies fluid to the injection apparatus.

A pump that produces high pressure fluid is often utilized as part of the fluid delivery skid to produce a spray, to be emitted from the spray arrays of the injection apparatus, with necessary small diameter droplets. The droplets are required to be of a small diameter to minimize potential damage to the gas turbine as well as to maximize the rate of evaporation inside the gas turbine intake. The high pressure from the pump limits the pump's range of operation if only one spray array is used. A single spray array typically has a water flow range of operation of 1.3 times its minimum flow. However, a water flow range of 2-3 times its minimum flow is necessary to cover the temperature and humidity conditions needed for power augmentation. To meet the water flow range of 2-3 times the spray array's minimum flow, some power augmentation systems employ multiple stages. Each stage includes one pump and is independently turned on and off to allow different flow ranges to cover the necessary flow range. Each pump is held at a constant speed and receives the unused amount of the flow at its entrance as part of a recirculation process. Such a system, however, requires multiple pumps, which increases the cost of the power augmentation system as well as adds to the size of the fluid delivery skid. For example, a system may require as many as six or more pumps. Moreover, the multiple pumps create difficulty in adding redundancy. The recirculation process, which is necessary to make use of the unused flow, requires recirculation valves that may typically erode and prove to be unreliable. Thus, a system is needed to more efficiently and effectively provide high pressure fluid for power augmentation of a gas turbine.

SUMMARY

A fluid delivery skid with a pre-fill system adapted for a power augmentation system includes one or more stages that have active and inactive states. Each of the stages includes a first and second valve, with each valve having an open and a closed position. In an active state, fluid is received within the stage, pressurized to a first desired level, and discharged. As fluid is received and pressurized, the first valve is in an open position while the second valve is in a closed position. As fluid is discharged, the first valve is in a closed position and the second valve is in an open position. In an inactive state, at least the second valve is in a closed position so at least a substantial portion of fluid is not discharged from the stage.

A power augmentation system for augmenting output power of a gas turbine includes a fluid delivery skid, including a pre-fill system, of one or more stages having active and inactive states. Each stage includes a first and second valve, each having an open position and a closed position. A pump connected to the fluid delivery skid feeds each of the stages. A control unit regulates the pump for activation or inactivation of the stages. A fluid source supplies fluid to the stages. Activation includes opening the pre-fill valve of the stage, filling the stage with fluid and pressurizing the fluid, closing the pre-fill valve, and opening the main valve to allow for the discharge of the fluid, while inactivation requires the closing of the main valve. An injection apparatus to distribute the discharged fluid is connected to the stages of the system.

A method for delivering fluid from a fluid delivery skid to an injection apparatus includes activating a stage of the skid. A stage includes a first and second valve each having open and closed positions. Activating the stage includes, with the first valve in an open position and the second valve in a closed position, filling the stage with fluid and pressurizing the fluid of the stage to a first desired level. The fluid is released with the first valve in a closed position and the second valve in an open position.

DETAILED DESCRIPTION

The present disclosure relates to a fluid delivery skid for supplying fluid to an injection apparatus. The injection apparatus provides the fluid to, for example, cool and humidify intake air of a gas turbine for power augmentation of the gas turbine.

Figure 1:
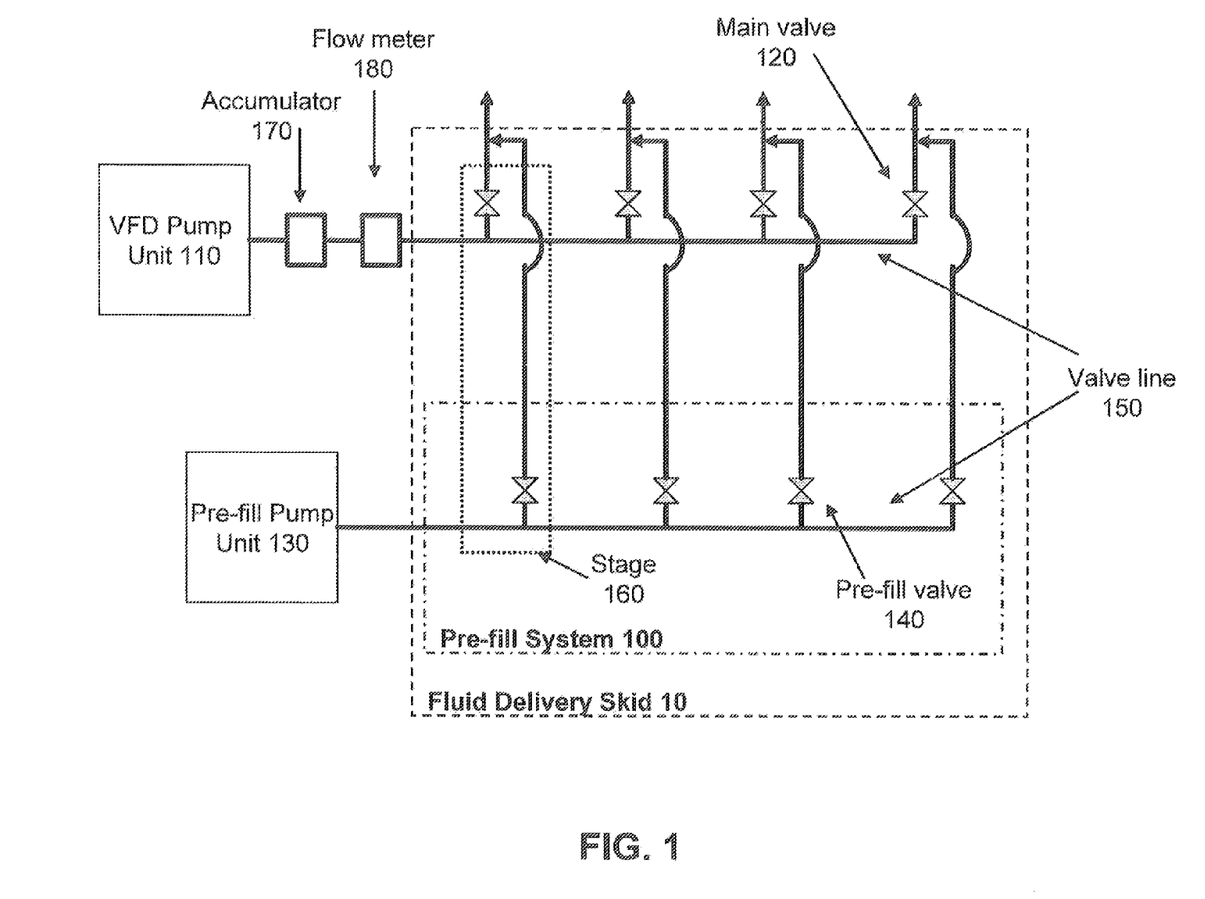
FIG. 1 is a diagram illustrating details of an exemplary fluid delivery skid.
Figure 2:
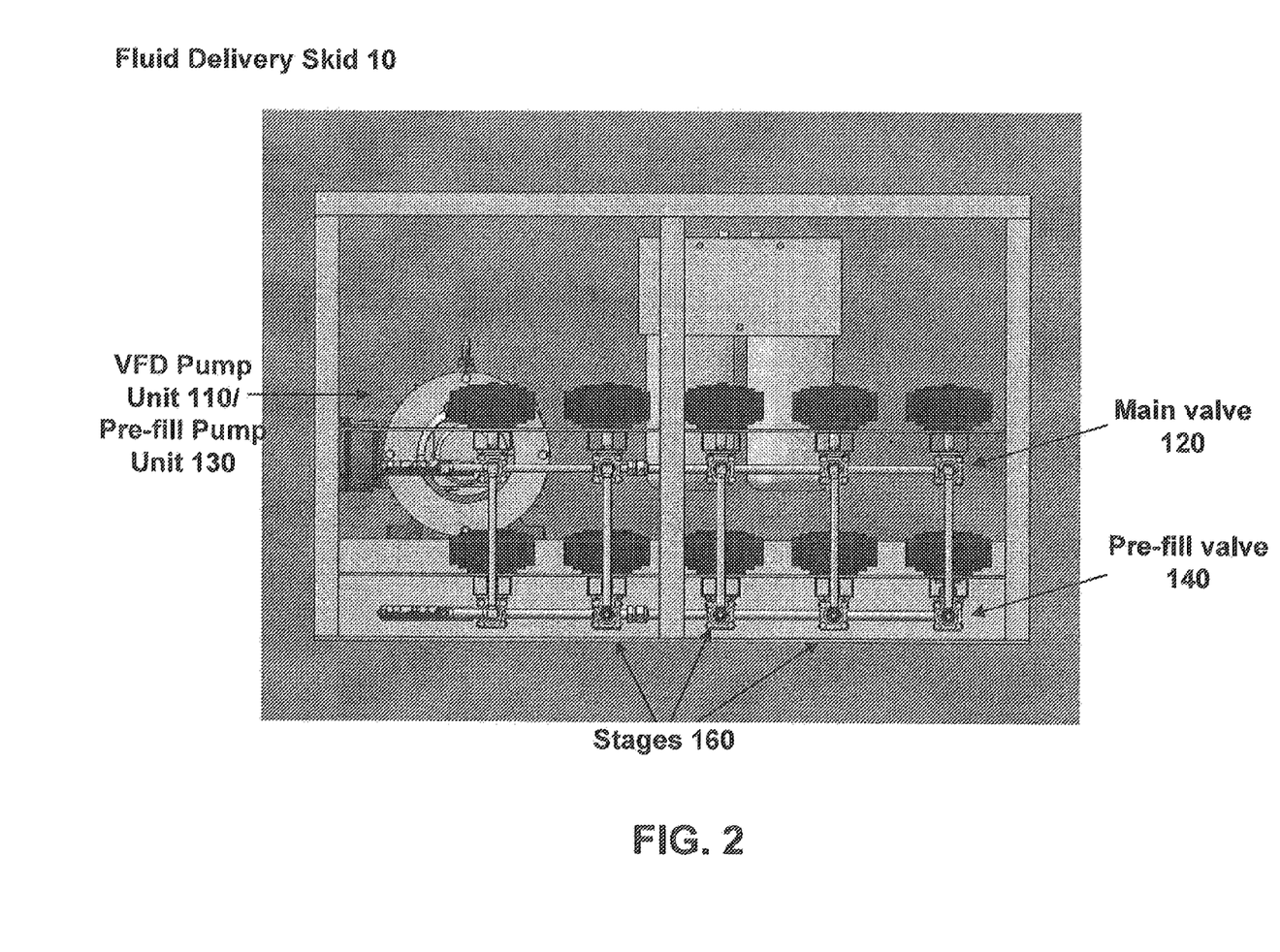
FIG. 2 is an diagram illustrating details of an exemplary fluid delivery skid.

FIG. 1 illustrates an exemplary fluid delivery skid 10, with pre-fill system 100, for supplying fluid. With reference to FIG. 2, an additional exemplary fluid delivery skid 10 for supplying fluid is shown.

The fluid delivery skid 10 includes one or more stages 160 with each stage 160 having active and inactive states. Each stage 160 has a first valve, such as a pre-fill valve 140 of the pre-fill system 100, and a second valve, such as a main valve 120. Each pre-fill valve 140 and each main valve 120 has an open position and a closed position. A pre-fill valve 140 and a main valve 120 of a stage 160 are connected in parallel to a common point to supply fluid from the fluid delivery skid 10.

In an active state, fluid is received within a stage 160, pressurized to a first desired level, and discharged. As fluid is received within the stage 160 and pressurized, the pre-fill valve 140 is in an open position and the main valve 120 is in a closed position. In certain embodiments, a small portion of the fluid may leak from a spray apparatus connected to the fluid delivery skid 10 before the first desired pressure is reached. The leaking may occur as soon as an amount of fluid enters the stage 160. As fluid is discharged from the stage 160, the pre-fill valve 140 is in a closed position and the main valve 120 is in an open position.

Moreover, in an active state, with the pre-fill valve 140 in a closed position and the main valve 120 in an open position, additional fluid is received within the stage 160, pressurized to a second desired level, and discharged. Similar to the above, in certain embodiments a portion of the fluid may be discharged before the second desired pressure level is reached. In an inactive state of the stage 160, at least the main valve 120 is in a closed position, so that a substantial portion of the fluid is not discharged from the stage 160.

The pre-fill valves 140 may be fed by a first pump, and the main valves 120 may be fed by a second pump, although in other embodiments a single pump may be utilized for the same purpose. One or more pumps may be grouped in parallel so that output lines of the pumps are combined into a single output line. The pre-fill system 100 may include a plurality of stages 160, with the same pump or group of pumps feeding each stage 160. The pump may include one or more pump units.

In the exemplary fluid delivery skid of FIG. 1, an exemplary second pump indicated as variable frequency drive (VFD) pump unit 110 is connected by a valve line 150 to each stage 160 for feeding the main valves 120. The VFD pump unit 110 operates to supply additional fluid and/or increase pressure to the fluid in the stages 160, to a second desired level. A frequency of the VFD pump unit 110 governs the pump speed and may be adjusted. The VFD pump unit 110 may be capable of pumping the additional fluid to a high pressure level. For example, the VFD pump unit 110 may pressurize the additional fluid to levels of approximately 100 bar (1500 psi) or higher. The VFD pump unit 110 may pressurize the additional fluid to a level that may be based upon, for example, ambient weather conditions. Other factors may be taken into account to determine the level at which to pressurize the additional fluid. A high pressure advantageously produces fluid droplets with a small diameter. For example, the fluid droplet diameter may be less than 40 microns.

An exemplary first pump, for example, pre-fill pump unit 130, is connected by a valve line 150 to each stage 160 of the pre-fill system for feeding the pre-fill valves 140. The pre-fill pump unit 130 may be, for example, a low-pressure pump that pressurizes the fluid to a first desired level. For example, in an active state, the pre-fill pump unit 130 may pressurize fluid to a first desired level with the pre-fill valve 140 in an open position and the main valve 120 in a closed position. After the first desired level has been reached, the pre-fill valves 140 may be regulated to a closed position.

In operation, a fluid delivery skid, such as the exemplary fluid delivery skid 10 with pre-fill system 100, is provided with fluid from a fluid source. Additionally, the fluid delivery skid 10 with pre-fill system 100 provides pressurized fluid at a desired flow rate. The pressurized fluid at the desired flow rate may be discharged from the fluid delivery skid 10 and supplied or injected to an injection apparatus or other apparatus or structure from outputs of the main valves 120, as indicated by the output arrows in FIG. 1. For example, each stage 160 may be connected to a spray array of an injection apparatus from a feed line emanating from each main valve 120.

As flow changes, the number of nozzles of an injection apparatus that are being utilized changes. The activation of one or more stages 160 results in the provision of the pressurized fluid, to the desired apparatus, at the desired flow rate. One or more stages 160 is activated to allow an increase of the flow rate, while the inactivation of one or more stages 160 allows a decrease of the flow rate while keeping the spray distribution within allowable parameters. A stage 160 is inactivated by closing the main valve 120 of the stage 160. Activation of a stage 160 includes an opening of its pre-fill valve 140 to fill the stage 160 with fluid and to pressurize the fluid of stage 160 to a first desired level by, for example, the pre-fill pump unit 130. The fluid of the stage 160 may be pressurized to, for example, 6 bar. Once the stage 160 is filled and pressurized, the pre-fill valve 140 is closed and the main valve 120 opened. Activation of a stage 160 further includes additional fluid being received within the stage 160, pressurized to a second desired level by, for example, the VFD pump unit 110, and discharged, with the pre-fill valve 140 in a closed position and the main valve 120 in an open position. The fluid begins to be discharged before the second desired pressure level is reached. Additionally, a small amount of fluid may leak from the pre-fill valve 140 and the main valve 120 prior to the opening of the valves 140 and 120 in certain embodiments. Thus, when a stage 160 is empty after not being utilized, the pre-fill pump unit 130 fills the stage 160 with fluid from, for example, a fluid source and pressurizes the stage 160 to a first desired level prior to the main valve 120 of the stage 160 being opened. An amount of air remaining in the stage 160 will be quickly pressurized. This ensures that the flow of fluid from the fluid delivery skid 10 continues evenly when a stage 160 is activated or deactivated. Without the inclusion of a first and second valve, such as a pre-fill valve 140 and a main valve 120, a stage 160, prior to activation, is filled with air and thus has low resistance. An opening of the main valve 120 results in fluid flow immediately being directed to the stage 160 due to its low resistance. The redirection of fluid flow to the newly-opened main valve 120 causes the fluid flow from the other main valves 120 to cease until the newly-activated stage 160 is purged of air. A single pump unit, such as the pre-fill pump unit 130 and VFD pump unit 110, covers the desired flow range but not the pressure range. Thus, the stages 160 are incorporated to match the flow and pressure provided by the pump, and the spray nozzles of an injection apparatus can generate the desired small fluid droplets. A stage 160 is activated without causing any of the fluid supply being injected by an array. In addition, as fluid is essentially incompressible, moving it from a low pressure to a high pressure requires a minimal amount of flow. Thus, activating a stage 160 barely disrupts the flow of fluid as the pressure in the skid 10 changes very quickly.

In a fluid delivery skid 10 that includes the pre-fill system 100 composed of n stages, the desired flow range and pressure range are achieved with one pump unit and n valves instead of with n pump units. As valves are much more cost effective than pumps, arid as on-off valves such as pre-fill valves 140 and main valves 120 are more cost effective than re-circulation valves, a great cost benefit is introduced by the pre-fill system 100.

An accumulator 170 may be connected to each stage 160 of the fluid delivery skid 10 at the main valves 120. The accumulator 170 operates to assist in the rapid pressurization of a newly-activated stage 160 when fluid is released. Although the stage 160 is mostly filled with fluid prior to the opening of the main valve 120, the accumulator 170 enhances the pressurization process by further pressurizing the fluid and by pressurizing an amount of air remaining in the stage 160. After activation of a stage 160, the accumulator 170 requires recharging. During recharging, the accumulator 170 may divert fluid flow from the activated stages 160. A flow meter 180, positioned downstream of the accumulator 170, may be connected to the fluid delivery skid 10 at the main valves 120 and operates to detect the decrease in fluid flow as the accumulator 170 is being recharged. Upon detection of the decrease in fluid flow, the flow meter 180 may increase the pump speed of the VFD pump unit 10 to compensate for the decrease. The flow meter 180 returns the pump speed to a steady state speed after the recharging of the accumulator 170. When opening a new stage 160 with larger area (i.e. the flow rate will increase) the pressure required by the system 100 will drop and thus the accumulator will 'unload' flow. This will cause the pump 110 to slow. Reducing the available flow area (i.e. the flow through the system is going to drop) causes the opposite effect.

In an exemplary embodiment, the accumulator 170 is not incorporated, and instead a valve is positioned at the downstream end of the stage 160. In this case, to perform the pre-fill operation, the upstream and downstream valves are opened to flush all the air out of the skid 10. Once the skid 10 is flushed, the downstream valve is closed and the pre-fill pump unit 130 is backed up. After the pressure rises to the correct level, the pre-fill valve 140 is closed and the main valve 120 is opened. This causes the amount of air to be reduced to effectively zero. The removal of the accumulator 170 removes capacitance from the system 100. Alternatively, the accumulator 170 may be included to even the flow for the flow meter 180, but it may be sized significantly smaller if it only has to perform this duty.

Figure 3:
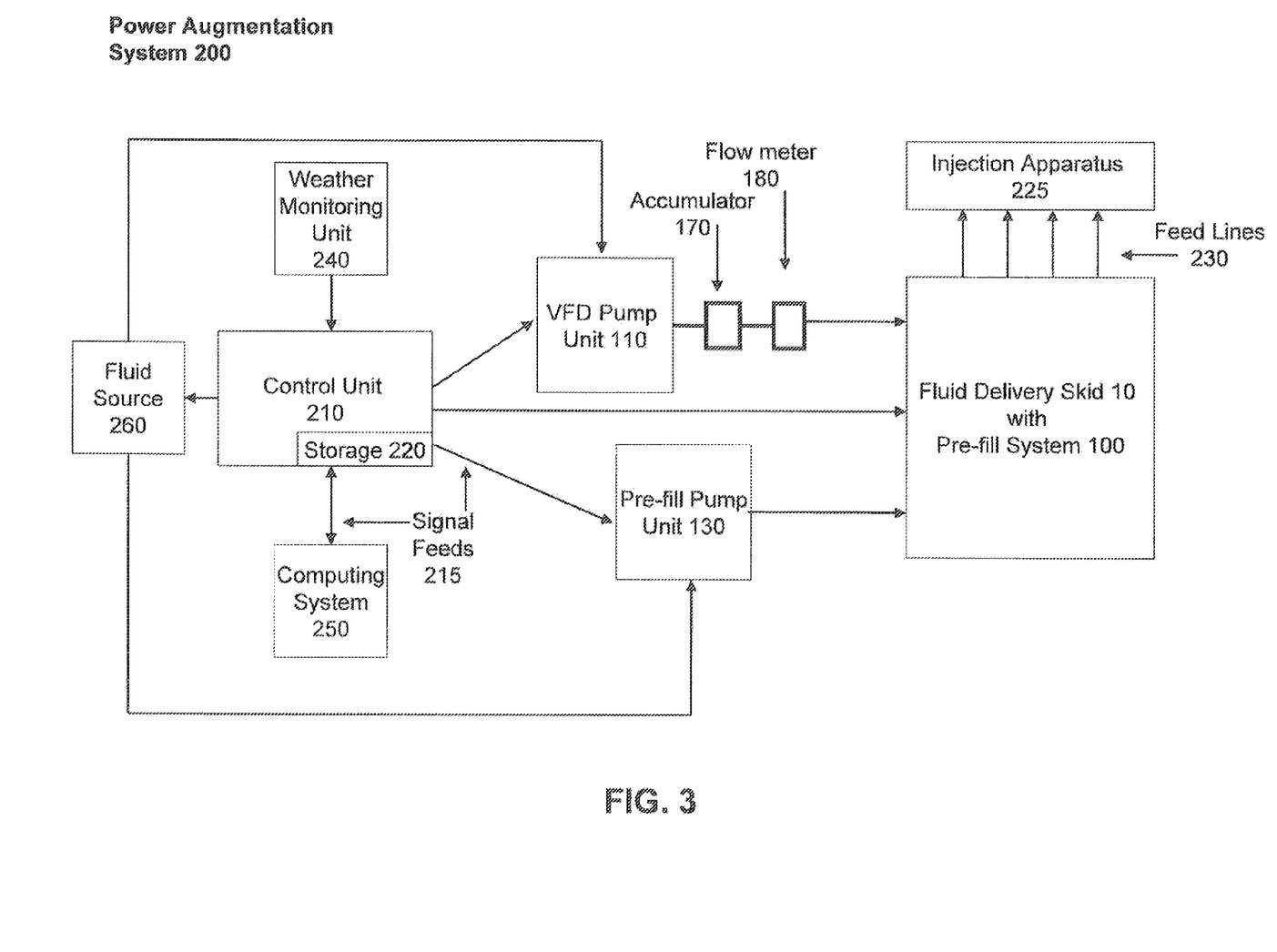
FIG. 3 is a diagram illustrating details of an exemplary power augmentation system.

Referring now to FIG. 3, a diagram of an exemplary power augmentation system 200 is shown. The exemplary power augmentation system 200 may be utilized, for example, as a supplemental feature to a gas turbine. As shown in FIG. 3, the exemplary power augmentation system 200 may comprise the exemplary pre-fill system 100 and fluid delivery skid 10, comprised of one or more stages 160, described above with reference to FIG. 1 for receiving fluid from a source and delivering pressurized fluid at a specified flow rate to a recipient. The pressurized fluid, which may be water or any other liquid, may be injected, for example, into an intake air path of a gas turbine to saturate and cool the air as it enters the gas turbine, thus augmenting the power output of the gas turbine.

The power augmentation system 200 includes a control unit 210 for providing control signals to a fluid delivery skid, such as, for example, the exemplary fluid delivery skid 10 with pre-fill system 100. The control unit 210 is connected, via signal feeds 215, to the VFD pump unit 110 and the pre-fill pump unit 130 to control the operation of the units 110 and 130. In particular, the control unit 210 operates to activate and inactivate the various stages 160 of the fluid delivery skid 10 to provide or discharge fluid at a desired flow rate from the fluid delivery skid 10. After activation of one or more stages 160, the fluid may be discharged at a new flow rate, which can by changed throughout operation.

The control unit 210 may be controlled from a control room or from a panel, for example. The control unit 210 may comprise manual controls as well as programmable controls that enable operation of the VFD pump unit 110 and the pre-fill pump unit 130 via signal feeds 215. The control unit 210 may include a storage means 220. The storage means 220 can include a random access memory (RAM) and/or a non-volatile memory such as read-only memory (ROM). One of ordinary skill in the art readily understands that a storage means can include various types of physical devices for temporary and/or persistent storage of data including, but not limited to, solid state, magnetic, optical, and combinational devices. For example, the storage means 220 may be implemented using one or more physical devices such as DRAM, PROMS, EPROMS, EEPROMS, flash memory, and the like. The storage means 220 can further comprise a computer program product including software code portions for performing method steps in accordance with embodiments when the computer program product is run on a computer device, for example, controlling an opening of a valve, such as a main valve 120 or a pre-fill valve 140 of the pre-fill system 100, in order to, in turn, control a fluid flow rate being supplied to a nozzle, for example. The control unit 210 may regulate the flow of water for its use in power augmentation by operating the pre-fill pump unit 130 and the VFD pump unit 110 to a specific pressure and also by regulating a particular nozzle utilized for augmentation purposes. Moreover, for power augmentation, at least one nozzle is activated or inactivated to achieve the proper flow rate corresponding to a power demand and ambient weather conditions. When power augmentation is initiated, the control unit 210 may calculate a water injection level based upon a calculated air flow. This air flow is then used to calculate a target relative humidity level to define the amount of water to inject. The calculation is then cycled as water is scheduled to allow a convergence of water injection rate to a stable flow. Additionally, the control unit 210 may monitor a flow scheduled in comparison to actual flow delivered. In an event the actual pressure is above an expected level, a blocked nozzle warning may be provided to the operator. In an event the actual pressure is lower than the pressure expected, a check for leaks warning may be provided to the operator.

In operating to activate stages 160, the control unit 210 determines the flow rate at which to deliver fluid from the fluid delivery skid 10. This determination may be based upon one or more factors. For example, ambient weather conditions may dictate a need for a specific flow rate. Alternative to determining the flow rate, the control unit 210 may be provided with a specified flow rate from a control room or an operator, for example.

Based upon the determined flow rate in which to deliver fluid from the fluid delivery skid 10, the control unit 210 determines the necessary stages 160 to activate to attain the determined flow rate from the skid 10. For example, a certain flow rate may require that three stages 160 be activated. If the determined flow rate then decreases, the new flow rate may necessitate the inactivation of one or more stages 160, for example, to reach the new flow rate.

The control unit 210 operates to activate a stage 160 by opening the pre-fill valve 140 of the stage 160. The pre-fill valve 140 may alternatively be manually opened. The pre-fill pump unit 130 is then regulated by the control unit 210, which activates the pre-fill pump unit 130 to fill the stage 160 with fluid and to pressurize the stage to a first desired level, which may be a low pressure. The fluid may be supplied from a fluid source 260, which may be controlled by the control unit 210 to provide the pump units with fluid. After filling the stage 160 and pressurizing the fluid of the stage 160, the pre-fill valve 140 of the stage 160 is closed by, for example, the control unit 210 or a manual operation. The main valve 120 of the stage 160 is manually opened or is opened by the control unit 210. The VFD pump unit 110 is regulated by the control unit 210 to provide and pump additional fluid, received from the fluid source 260, at a second desired pressure level necessary to provide the additional fluid at the determined flow rate.

The control unit 210 operates to inactive one or more stages 160 of the fluid delivery skid 10 by closing at least the main valve 120 of the stages 160 to be inactivated. The control unit 210 may receive a signal to initiate the inactivation from a control room or an operator, or the control unit 210 may determine the need to inactivate a stage 160. The main valve 120 may be closed by the control unit 210 or may be manually closed by an operator, for example.

An injection apparatus 225 is connected to the fluid delivery skid 10. For example, feed lines 230 may connect the pre-fill system 100 and the main valves 120 to the injection apparatus 225. An individual feed line 230 may be utilized so that each stage 160 of the fluid delivery skid 10 is connected to the injection apparatus 225.

The injection apparatus 225 may include one or more spray arrays that deliver the fluid at the determined flow rate as provided by the skid 10, which may be adjusted after activation of one or more stages. Each spray array may comprise one or more nozzles. The one or more nozzles of the injection apparatus 225 may inject a spray of atomized fluid, such as water or other liquid, into an air stream of a gas turbine inlet duct, thereby increasing the mass flow of the air stream, wherein the power output from the gas turbine engine is augmented.

A weather monitoring unit 240 may be connected to the control unit 210 via a signal feed 215 to provide updated ambient conditions that may affect performance of a gas turbine being used with the power augmentation system 200, for example. The ambient conditions may be measured and reported to the control unit 210 to, for example, play a factor in the determination of the flow rate in which to deliver the fluid at a target level for inlet air saturation. The ambient conditions comprise environmental factors that may influence the operation of the gas turbine, including but not limited to, temperature, humidity, and air pressure. In an embodiment, each of temperature, humidity and air pressure are monitored. The weather monitoring unit 240 (details not shown) comprises a dry bulb thermometer and an air humidity measuring device in one exemplary embodiment. In other alternative embodiments, the weather monitoring unit 240 may include a dry bulb thermometer and a wet bulb thermometer. In another alternative embodiment, the weather monitoring unit 240 may comprise a barometric pressure measuring device. In still other embodiments, for ambient pressure measurements, the weather monitoring unit 240 may comprise other components and/or combinations of components well known to those in the art to monitor and/or measure ambient weather conditions. The weather information is processed by the control unit 210, where the control unit 210 may deliver to an operator key operational information such as allowable evaporation water quantity, icing risk, etc.

In an embodiment, a computing system 250 is connected to the control unit 210 by a signal feed 215. The computing system 250 tracks and reports performance data as obtained from the control unit 210.

Figure 4:
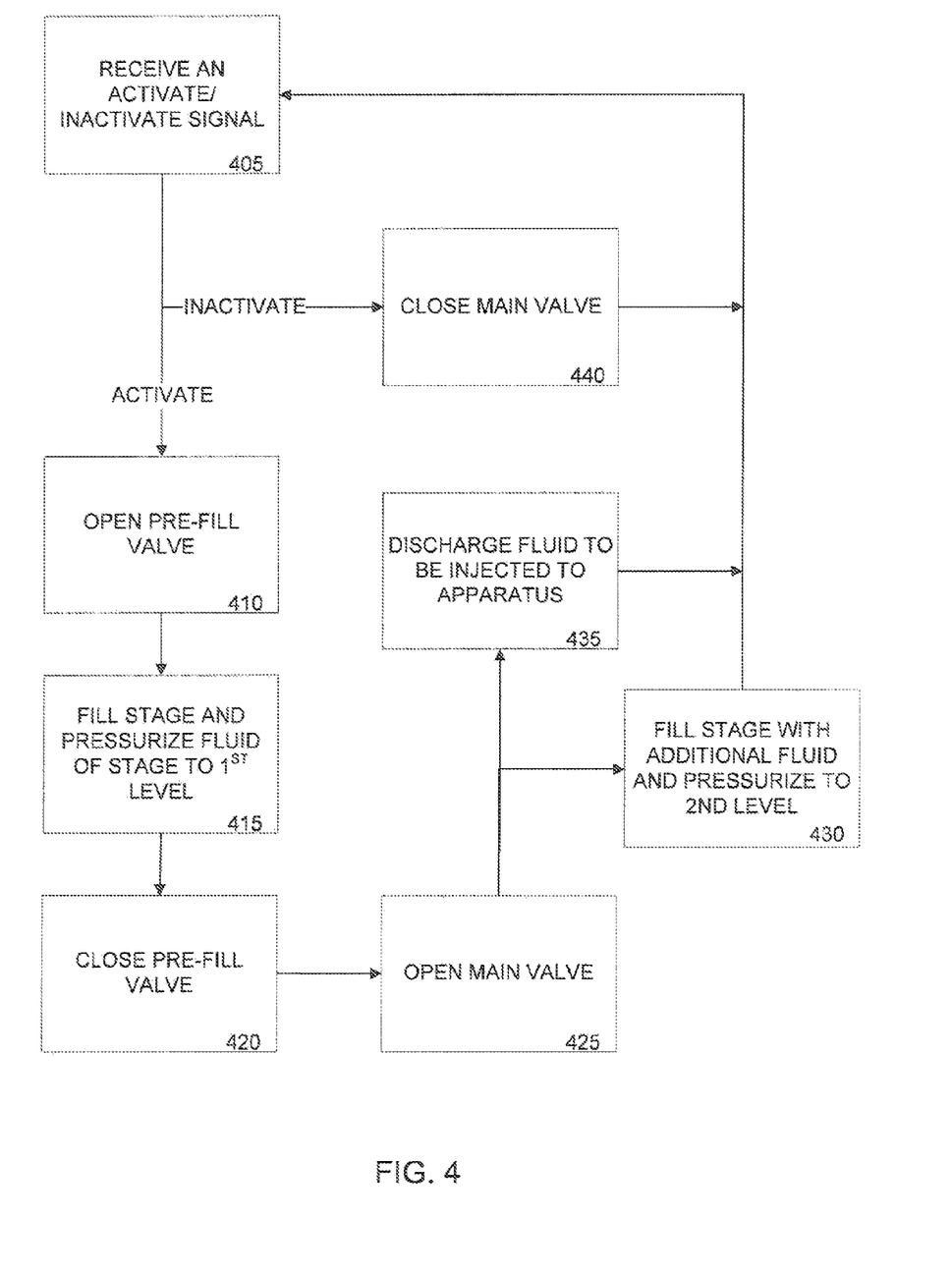
FIG. 4 is a flow chart illustrating an exemplary method for delivering fluid from an exemplary fluid delivery skid to an injection apparatus.

Referring now to FIG. 4, a flow chart is shown of a method for delivering fluid from a fluid delivery skid, such as the exemplary skid 10 with pre-fill system 100, to an injection apparatus, such as the injection apparatus 225.

At 405 of the method, an activate or deactivate signal is received by the fluid delivery skid 10 indicating the need to activate or inactivate a stage of the skid 10, such as an exemplary stage 160. The signal may be, for example, generated by the control unit 210. Alternatively, the signal may be specified by a control room or operator and provided to the control unit 210. The signal to activate or inactivate a stage 160 may signify the need to increase or decrease, respectively, fluid flow in order to supply a preferred amount of fluid.

If the signal is an inactivation signal, at 440, a main valve 120 of a stage 160 is closed to inactivate the stage 160. The main valve 120 may be manually closed by an operator or may be closed by the control unit 210.

If the signal is an activation signal, at 410, activation of a stage 160 is initiated by opening a pre-fill valve 140 of the stage 160. The pre-fill valve 140 may be manually opened or opened by the control unit 210.

At 415, the stage 160 is filled with fluid and the fluid is pressurized to a first desired level. A pre-fill pump unit 130 may pump the fluid to pressurize the fluid to the first desired level as indicated and controlled by the control unit 210. At 420, the pre-fill valve 140 is closed. Thus, the stage 160, comprised of the pre-fill valve 140 and main valve 120, is filled and pressurized to allow for the main valve 120 to supply the pressurized fluid.

At 425, the main valve 120 is opened. The main valve 120 may be manually opened or opened by the control unit 210.

At 430, a VFD pump unit 110 supplies additional fluid to the stage 160 and pressurizes the additional fluid to a second desired level. The pressure may be a high level, for example 100 bar, as indicated and controlled by the control unit 210. At 435, as the additional fluid is being supplied and pressurized, the fluid is discharged to be injected to an apparatus, such as the exemplary injection apparatus 225.

Following activation or inactivation of a stage 160, the method returns to receiving an activation/inactivation signal to respectively activate or inactivate a stage 160 to meet a required fluid flow rate.

Figure 5:
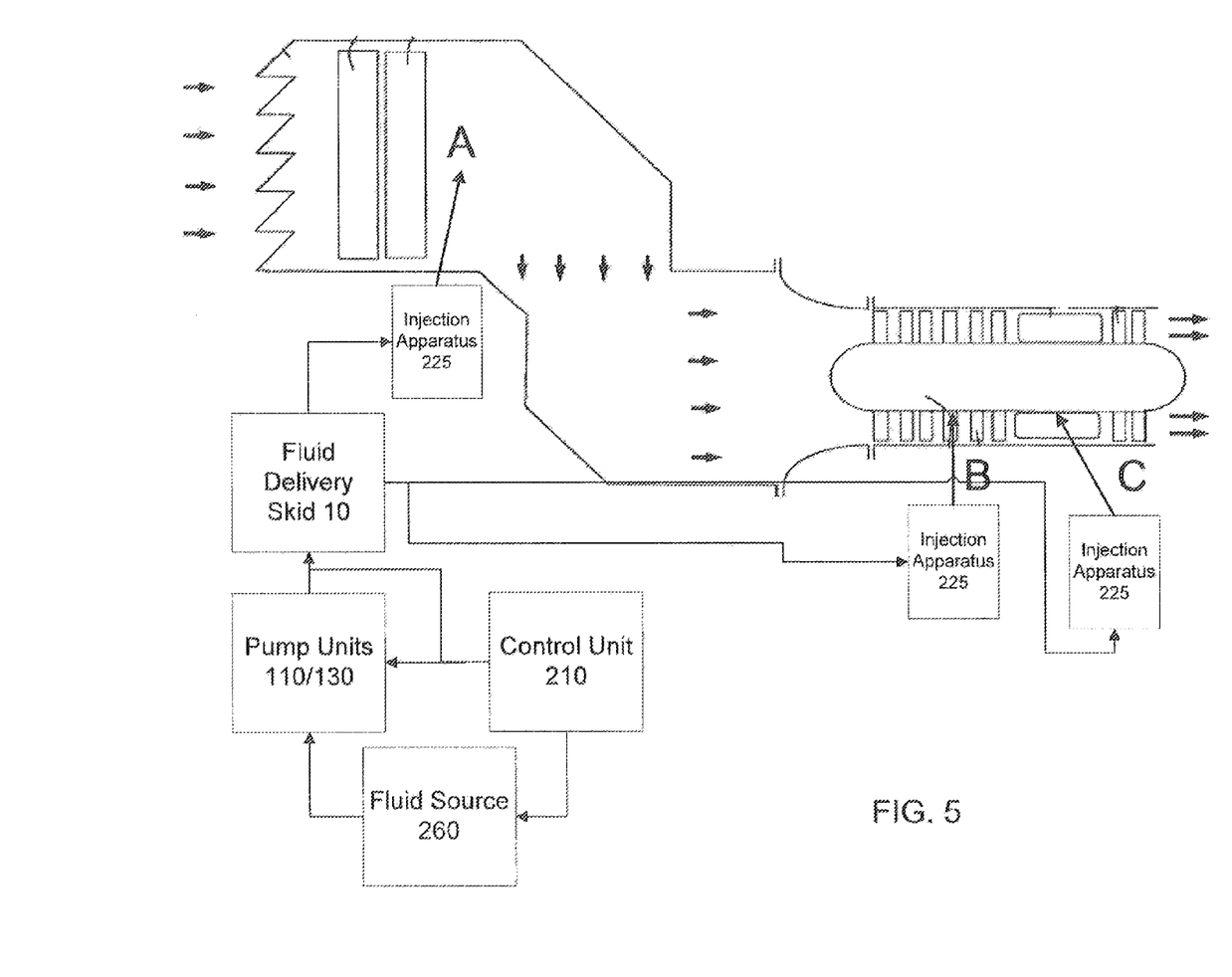
FIG. 5 is a diagram illustrating details of an exemplary power augmentation system utilized with a gas turbine.

Referring now to FIG. 5, a diagram illustrating details of an exemplary fluid delivery skid and an exemplary power augmentation system utilized with a gas turbine is shown. The exemplary fluid delivery skid 10, pre-fill system 100, and power augmentation system 200, described above with relation to FIGS. 1-4, may be utilized with a gas turbine to augment the output power of the gas turbine. A typical gas turbine may comprise a turbine inlet duct, a combustor, and a compressor having at least one compressor blade. A fluid source 260 may be connected to the control unit 210 and the pumps 110 and 130 for supplying fluid to the pre-fill system 100 as directed by the control unit 210.

Injection points from which the fluid flows from the injection apparatus 225 as provided by the exemplary fluid delivery skid 10 may include, but are not limited to, those as described herein associated with evaporative cooling, compressor inter-cooling, or combustor flame cooling, as examples. When over-saturating the air for power augmentation, air mass input into the gas turbine and the gas turbine components are defined to place restrictions of the water injection levels so that the air mass flow is within the acceptable limitations of the gas turbine engine's design. Subsequently, ambient weather conditions and gas turbine load demands can be input into the control unit 210 for determination of a fluid flow rate and pressurization level.

An evaporative cooling system, the point of use indicated by "A" in FIG. 5, is a "fogging" system where water is sprayed at the air inlet as a mist of fine droplets (fog) that evaporates. A compressor inter-cooling system, the point of use indicated by "B" in FIG. 5, is a "wet compression" system for spraying water into a high density air stream at a compressor inter-stage. A steam system, the point of use indicated by "C" in FIG. 5, is a system for spraying water into the combustor.

In an exemplary evaporative cooling system ("A"), high pressure water is fed from the fluid delivery skid 10 to an injection apparatus, such as the injection apparatus 225 which may include as a nozzle holder, which is installed inside the duct and far upstream of the compressor inlet face. The nozzle holder may comprises a tube having multiple nozzles which atomize water into a spray of fine droplets, for example, typically ranging from about 10 to about 20 microns, and more typically ranging from about 10 to about 15 microns. The droplets are the result of atomization, for example, typically at about 80 to about 140 bar pressure as provided by the VFD pump unit 110. The droplets are carried/suspended with the air stream and evaporate prior to entering the compressor as there is sufficiently long residence time for the air to travel from the nozzle tip to the compressor inlet. The evaporation exchanges water's latent heat for air sensible heat so that the air temperature is lowered by the evaporation. A lower air temperature corresponds to a higher density of the air, and therefore, a higher mass flow that results in a higher shaft output. The required water flow rate is set by the VFD pump unit 110. The evaporative cooling operation is closed by closing the main valves 120. U.S. Pat. No. 6,718,771 to Kopko illustrates an exemplary evaporative cooling system enabling gas turbine operations at high temperatures and is incorporated by reference herein in its entirety.

An exemplary compressor inter-cooling system ("B") is a wet compression system, meaning that water in the form of small droplets evaporates inside the compressor during the compression work. The retention time for the air through a compressor is in the range of milliseconds. During this time the droplets evaporate as a result of the initial droplet size. The evaporative process is driven by the rapid temperature increase resulting from the compression work. When a stage 160 is pre-filled and pressurized by, for example, the pre-fill pump unit 130, a main valve 120 opens, and high pressure water is fed to an injection apparatus, such as the injection apparatus 225 which may include at least one nozzle, from the VFD pump unit 110. The at least one nozzle is installed to inject water into the compressor gas path (e.g., nozzles may be installed to inject water in between two disks). The at least one nozzle atomizes the water into a spray of small droplets, for example, ranging from about 10 to about 50 microns, and preferably in the range of about 10 to about 30 microns. The small droplet sizes result from atomization, preferably at about 80 to about 140 bar pressure, although other suitable bar pressure may also be utilized. The small droplets will evaporate before exiting the compressor. U.S. Pat. No. 6,644,935 to Ingistov describes an exemplary nozzle assembly for inter-stage compressor water injection, which is incorporated herein by reference in its entirety. The evaporation cools the air and thereby increases the air density, which increases mass flow and results in a higher power output. Additionally, the cooling of the compressor results in a lower compressor exit temperature, which means that cooler air is delivered to the combustor. This cooler air to the combustor means that more fuel can be fired while maintaining a constant firing temperature thereby providing an increase in the power output. The required water flow rate is set by the VFD pump unit 110. To shut down the wet compression, one or more main valves 120 are closed. Alternatively, nozzles for wet compression can be installed upstream of the compressor inlet. The principal operation will be the same as for the inter-stage mounted nozzles as per the description above.

An exemplary combustor cooling system ("C") includes an injection apparatus, such as the injection apparatus 225 which may include at least one nozzle, for injecting droplets of water into the combustor. The water's latent heat is exchanged for flame sensible heat, thereby suppressing the flame's temperature. A main valve 120 opens and allows the feeding of high pressure water to the at least one nozzle, after the stage 160 is filled and pressurized. The at least one nozzle atomizes the water into a spray. The spray comprises droplets typically ranging in size from about 10 to about 50 microns, and more typically in the range of about 10 to about 30 microns. These droplets result from atomizing at about 100 to about 200 bar pressure. As should be understood, alternative size droplets and/or atomizing at other pressures may also be utilized as may be desired. The flame evaporates the water to form steam. The steam expands through the turbine, thus contributing to the mass flow and providing a power augmenting effect. Further, as the flame temperature is suppressed, more fuel can be fired while maintaining a constant firing temperature. Firing more fuel provides additional power output. The required water flow rate is set by the VFD pump unit 110. To shut down the combustor cooling, the main valve 120 is closed. U.S. Pat. No. 3,976,661 to Cheng is an example of power augmentation effects by injecting into the combustor and is incorporated herein by reference in its entirety.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This disclosure is intended to cover any adaptations or variations of the embodiments discussed herein.

What is claimed:

1. A fluid delivery skid adapted for a power augmentation system, comprising:
    one or more stages having active and inactive states, with each of the stages comprising at least first and second valves, with the first and second valves each having open and closed positions;
    wherein in an active state, fluid is received within the stage, pressurized to a first desired level, and discharged, wherein as the first valve is in an open position and the second valve is in a closed position, fluid is received within the stage and pressurized, and wherein as the first valve is in a closed position and the second valve is in an open position, fluid is discharged; and
    wherein in an inactive state, at least the second valve is in a closed position, so that at least a substantial portion of fluid is not discharged from the stage.

2. The fluid delivery skid of claim 1, wherein the first valve is fed by a first pump and the second valve is fed by a second pump.

3. The fluid delivery skid of claim 1, comprising a plurality of stages, wherein each of the plurality of stages is fed by a pump, wherein the same pump feeds each stage.

4. The fluid delivery skid of claim 3, wherein the pump comprises a first pump and a second pump, the first pump for feeding the first valve of each of the plurality of stages, and the second pump for feeding the second valve of each of the plurality of stages.

5. The fluid delivery skid of claim 1, wherein fluid received within the stage is provided to the stage from a fluid source.

6. The fluid delivery skid of claim 1, wherein fluid discharged from the stage is delivered to an injection apparatus.

7. The fluid delivery skid of claim 1, wherein in an active state, additional fluid is received within the stage, pressurized to a second desired level, and discharged, wherein as additional fluid is received within the stage, pressurized to the second desired level, and discharged, the first valve is in a closed position and the second valve is in an open position.

8. The fluid delivery skid of claim 7, wherein the second desired level is based upon ambient weather conditions.

9. The fluid delivery skid of claim 7, wherein in an active state when fluid is released, an accumulator further pressurizes the fluid and pressurizes an amount of air remaining in the stage.

10. The fluid delivery skid of claim 9, wherein a speed at which the additional fluid is pressurized is increased.

11. The fluid delivery skid of claim 1, wherein as the first valve is in an open position and the second valve is in a closed position, and fluid is received within the stage and pressurized, a small amount of fluid is leaked through the second valve.

12. The fluid delivery skid of claim 1, wherein in an inactive state when at least the second valve is in a closed position, a small portion of fluid is leaked through the first and/or second valve.

13. A power augmentation system, comprising
a fluid delivery skid comprising one or more stages having active and inactive states, with each of the stages comprising at least first and second valves, with the first and second valves each having open and closed positions;
a pump connected to the fluid delivery skid that feeds each of the stages;
a control unit connected to the pump that regulates the pump and connected to the fluid delivery skid to regulate the first and second valves;
a fluid source that supplies fluid to the one or more stages;
wherein in an active state, fluid is received within the stage, pressurized to a first desired level, and discharged, wherein as the first valve is in an open position and the second valve is in a closed position, fluid is received within the stage and pressurized, and wherein as the first valve is in a closed position and the second valve is in an open position, fluid is discharged; and
wherein in an inactive state, at least the second valve is in a closed position, so that at least a substantial portion of fluid is not discharged from the stage.

14. The power augmentation system of claim 13, further comprising an injection apparatus that receives the discharged fluid.

15. The power augmentation system of claim 13, wherein the pump comprises a first pump and a second pump, the first pump feeding the first valve of each of the plurality of stages, and the second pump feeding the second valve of each of the plurality of stages.

16. The power augmentation system of claim 13, wherein in an active state, additional fluid is received within the stage, pressurized to a second desired level, and discharged, wherein as additional fluid is received within the stage, pressurized to the second desired level, and discharged, the first valve is in a closed position and the second valve is in an open position.

17. The power augmentation system of claim 16, wherein the pump comprises a first pump and a second pump, the first pump pressurizing the fluid to the first desired level, and the second pump pressurizing the additional fluid to the second desired level.

18. The power augmentation system of claim 16, wherein the second desired level is based upon ambient weather conditions.

19. The power augmentation system of claim 13, further comprising an accumulator connected to each of the one or more stages, wherein in an active state when fluid is released, the accumulator further pressurizes the fluid and an amount of air remaining in the stage.

20. The power augmentation system of claim 19, further comprising a flow meter to increase a speed at which the pump operates.

21. The power augmentation system of claim 13, wherein the control unit regulates the pump by:

determining a flow rate at which to discharge fluid;
determining stages to activate to achieve the determined flow rate;
regulating the pump to achieve an active state for the determined stages by (i) opening the pre-fill valves; (ii) regulating operation of the pump to fill the stages with fluid and pressurize the fluid of the stages to the first desired level; (iii) closing the pre-fill valves; (iv) opening the main valves of the stages; and (v) regulating the operation of the pump to provide additional fluid to the stages and to pressurize the additional fluid of the stages to a second desired level.

22. The power augmentation system of claim 21, wherein determining the flow rate at which to release fluid is based upon ambient weather conditions.

23. The power augmentation system of claim 13, further comprising:
a weather monitoring unit connected to the control unit, wherein the weather unit provides ambient weather conditions to the control unit.

24. The power augmentation system of claim 13, further comprising:
a computing system connected to the control unit, wherein the computing system tracks and reports performance data.

25. The power augmentation system of claim 13, wherein the pump comprises a low-pressure pump unit and a high-pressure pump unit.

26. A method for injecting fluid from a fluid delivery skid to an injection apparatus, the method comprising:
activating at least one stage of the fluid delivery skid having one or more stages having active and inactive states, with each of the stages comprising at least first and second valves, with the first and second valves each having open and closed positions, wherein activating comprises:
with the first valve in an open position and the second valve in a closed position, filling the stage with fluid and pressurizing the fluid to a first desired level;
with the first valve in a closed position and the second valve in an open position, discharging the fluid.

27. The method of claim 26, further comprising:
receiving an indication from a control unit to activate one or more stages.

28. The method of claim 26, further comprising:
receiving an indication from a control unit to deactivate one or more stages.

29. The method of claim 28, further comprising:
inactivating the indicated stages by closing at least the second valve so that at least a substantial portion of the fluid is not discharged from the stage.

30. The method of claim 26, wherein activating at least one stage of the fluid delivery skid further comprises, with the first valve in a closed position and the second valve in an open position, filling the stage with additional fluid and pressurizing the additional fluid to a second desired level.

31. The method of claim 30, wherein the additional fluid is pressurized to a level higher than the first desired level of the fluid.

32. The method of claim 26, wherein pressurizing the fluid to a first desired level comprises pumping to achieve a pressure at the first desired level indicated by a control unit.

* * * * *